United States Patent

Fleck et al.

Patent Number: 5,564,065
Date of Patent: Oct. 8, 1996

[54] CARBON MONOXIDE AIR FILTER

[75] Inventors: Michael Fleck, Schaumburg; George Benda, Itasca, both of Ill.

[73] Assignee: Chelsea Group Ltd., Itasca, Ill.

[21] Appl. No.: 374,891

[22] Filed: Jan. 19, 1995

[51] Int. Cl.$^6$ .................................................. B01J 19/00
[52] U.S. Cl. ................ 422/186.3; 588/227; 204/157.15; 204/157.3; 204/157.47; 204/157.5; 55/385.2
[58] Field of Search ............ 204/157.15, 157.3, 204/157.47, 157.5; 588/227; 55/385.2; 422/186.3

[56] References Cited

U.S. PATENT DOCUMENTS

| | | | |
|---|---|---|---|
| 4,892,712 | 1/1990 | Robertson | 422/186 |
| 4,966,759 | 10/1990 | Robertson | 422/186 |
| 5,032,241 | 7/1991 | Robertson et al. | 204/157.15 |
| 5,152,814 | 10/1992 | Nelson | 55/270 |
| 5,204,309 | 4/1993 | Vorob'iev et al. | 502/306 |
| 5,225,390 | 7/1993 | Vogel et al. | 502/309 |
| 5,308,458 | 5/1994 | Urwin et al. | 204/157 |

FOREIGN PATENT DOCUMENTS 1139139  5/1989  Japan .

OTHER PUBLICATIONS

CA 107:241869.
CA 98:207390.
M. Daroux et al. Photocatalytic Oxidation of Ethane Over $TiO_2$–Canadian J. of Chem E. Aug. 85.
P. Pichat et al Photocatalytic Oxidation of Various Compounds–Canadian J. of Chem E. Feb. 82.
UV Light Knocks out $No_x$ From Fluegas–Chementator–Chemical Engineering Feb. 94.
Cure Sick Buildings–Inside R&D Mar. 1, 1995.
Air Cleaning Technologies–View Graph Copies NISI–ATP Workshop Jan. 11, 1995.

*Primary Examiner*—Kathryn Gorgos
*Assistant Examiner*—C. Delacroix-Muirheid
*Attorney, Agent, or Firm*—Clifford Kraft

[57] ABSTRACT

A reaction chamber is filled with a fine fibrous material capable of holding powdered anatase titanium dioxide. Embedded in the fibrous mesh is a source of ultraviolet light that is used to photo-excite the titanium dioxide. Air containing carbon monoxide is passed through the reaction chamber, and carbon monoxide is oxidized to carbon dioxide which then passes out of the filter. An alternative embodiment is a rectangular plate several feet square containing fibrous material containing titanium dioxide. Ultraviolet light impinges on the fibrous material photo-exciting the titanium dioxide. When air from an HVAC system is passed through the filter, carbon monoxide is oxidized into carbon dioxide and thus effectively removed from the air. Ultraviolet light can alternatively be supplied to the filter via lossy optical waveguides or fiber optics. These waveguides may be coated with titanium dioxide or the titanium dioxide may be separately suspended in the filter.

4 Claims, 5 Drawing Sheets

CARBON MONOXIDE AIR FILTER

BACKGROUND

1. Field of the Invention

This invention relates generally to the field of air filtering for buildings and more specifically to the filtering of carbon monoxide from air.

2. Description of the Related Art

It is undesirable to have carbon monoxide present in the breathable air of commercial or private buildings. However, various small amounts of this poisonous gas are always present since it is produced by automobiles and other industrial processes.

Prior filtering techniques for carbon monoxide have generally required either passing the gas over a catalyst at high temperatures to convert it to carbon dioxide, or else trapping the gas in some sort of absorptive medium. Both of these techniques are undesirable for continuous filtering of building air. The first method requires considerable energy to heat the catalyst material; the second requires frequent replacement of the filter material. A filter with high energy usage and high temperatures is particularly undesirable for a residence where energy costs and safety are both very important. Any filter that requires periodic replacement of its internal parts is undesirable from a cost standpoint. It is also fairly well established that filters that require periodic maintenance may not be well maintained in practice.

Titanium dioxide, along with other materials, is a well known catalyst, and has used been along with a reducing agent, to reduce nitrogen oxides in flue gas (Vogel et al. U.S. Pat. No. 5,225,390). It has also been used as a basis for catalysts that oxidize carbon monoxide and various hydrocarbons (Vorob'iev U.S. Pat. No. 5,204,309). However, to accomplish this, gas temperatures must be higher than 100 degrees C. A typical temperature range is 100 degrees C. to 300 degrees C.

It is known in the art of liquid filtering that titanium dioxide possesses the property of photo-catalytic activity. Here, the titanium dioxide becomes excited by ultraviolet light to act as a very effective catalyst to oxidize hydrocarbons, in solution. A disc of borosilicate glass can be coated with anatase titanium dioxide. Such a reactor can be spun at high RPM in the presence of ultraviolet light while liquids containing photocatalytically degradable organic material are applied to the disk (Urwin et al. U.S. Pat. No. 5,308,458). Dry titanium dioxide has been used to convert ethane to carbon dioxide and water (Daroux et al. Canadian J. of Chem. Eng. vol 63, Aug. 85).

What is badly needed in the field of indoor air quality and HVAC is a low priced passive filter for carbon monoxide in air that works at room temperature and does not become contaminated so as to require periodic replacement or maintenance. This filter should function in a dry state and not require moving parts. It should remove most of the carbon monoxide normally present in breathable air as this air is passed through it at a reasonable flow rate. In addition, the filter should be simple to manufacture.

SUMMARY OF THE INVENTION

A tube, bulb, flat tile, or other reaction chamber is filled with a fine fibrous material such as fiberglass that has been coated with titanium dioxide. Embedded in the mesh of fibrous material is a source of ultraviolet light that excites the titanium dioxide into a photocatalytic state.

Incident photons create electron-hole pairs in the titanium dioxide forming an active surface that has an affinity for oxygen molecules. When a CO molecule attaches to the titanium oxide-oxygen radical, the entire complex oxidizes the CO to carbon dioxide, a stable compound which is then released. Thus incoming carbon monoxide is effectively oxidized to carbon dioxide. There is no poisoning or degradation of the titanium dioxide in the filter by this process. Since carbon dioxide in low concentrations in breathable air is not objectionable, the filter converts a poisonous, very undesirable gas, to a stable, not undesirable one.

One embodiment of the present invention is to form filter plates several feet square of the fibrous filter material. Each plate can contain a UV source, or the light can be piped into the material with lossy fiber optics (light fibers that loose light through their outer walls). The lossy light fibers themselves can be coated with titanium dioxide which becomes photocatalytic anytime UV light is in the fiber. Such lossy fibers can be formed into flat plates or placed in a bulb or chamber. The fiber ends can be terminated in a UV reflector to cause light reaching the fiber end to travel backward down the fiber and more efficiently defuse into the titanium dioxide.

Such filters can be placed into the airflow of a building HVAC system to effectively remove CO from the circulating air supply of a building. These filters also have uses for filtering carbon monoxide from flow gases in pipes.

BRIEF DESCRIPTION OF THE DRAWINGS

For a more complete understanding of this invention, reference should now be made to the embodiments illustrated in greater detail in the accompanying drawings and described below by way of examples of the invention.

It should be understood, of course, that the invention is not necessarily limited to the particular embodiments illustrated herein.

DESCRIPTION OF PREFERRED EMBODIMENTS

Figure 1:
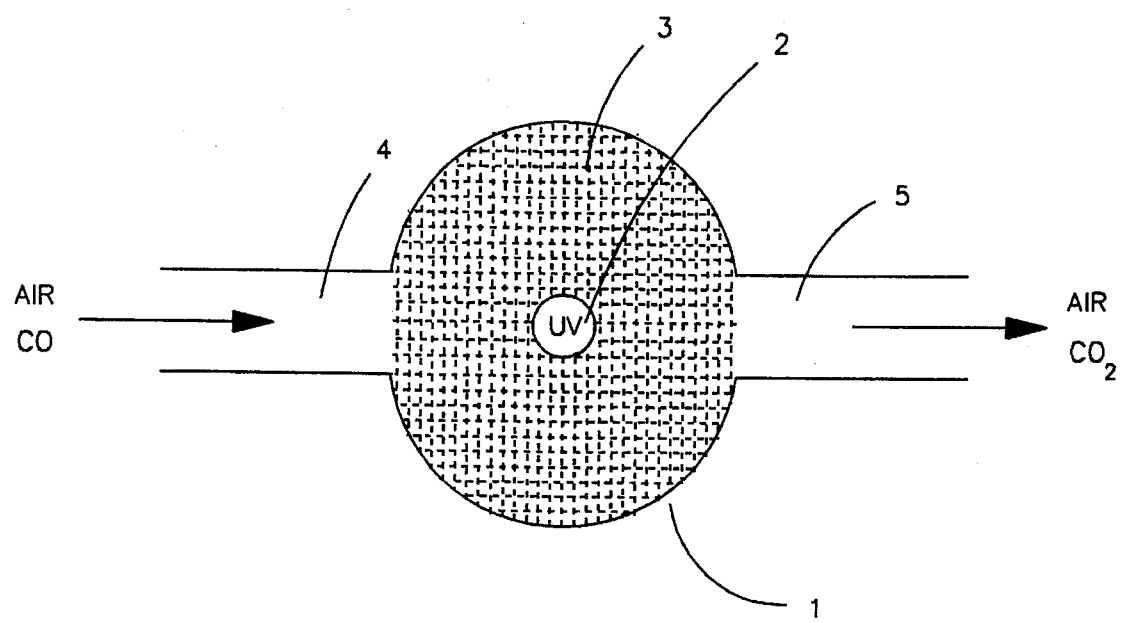
FIG. 1 is a schematic diagram showing a bulb or reaction chamber filled with titanium dioxide and illuminated with an internal ultraviolet light source.

The carbon monoxide filter is shown schematically in FIG. 1. Here a reaction chamber 1 forming a closed area is filled with a web or matrix of inert material 3. This inert material must be such that it can hold titanium dioxide and in addition not react with incoming air. Its most important property is that it provide mechanical support for the powered titanium dioxide. An addition, it should not be oxidized by the passage of moisture. Also, since the titanium dioxide is excited by light photons, this material should not compete for photons. A simple fibrous material such as fiber glass make by Owens Corning is quite sufficient. However, the invention is not limited to the use of fiberglass; any fibrous material capable of holding powdered titanium dioxide, either with and adhesive, or without, is acceptable and may be incorporated into the present invention.

The web or fibrous material 3 is coated with anatase titanium dioxide that is applied in the form of a fine powder. The particle size can vary over a wide range. The important feature of the titanium dioxide is that there be sufficient surface area to absorb photons and interact with the carbon monoxide present in air. High dispersion pigment grade anatase titanium dioxide having a specific surface area of from about 10 to 50 square meters per gram is entirely adequate. This material is provided commercially as type AO-1 by Chimex Technology Co. of Uzbekistan and other companies. Titanium dioxide in rutile form having a surface area of less than 10 square meters per gram does not have enough surface area for use in the present invention. It is possible to use anatase material as fine as 200 square meters per gram. In general, the more surface area, the better.

The titanium dioxide must be made to adhere to the fibrous matrix. In a dense matrix, the powder may simply be sprayed in. However, this technique may not totally coat the fibers with the density desired. A better method is to immerse the matrix in a low viscosity adhesive liquid so that most fiber surfaces wet. Then the powdered titanium dioxide will adhere to the fibers. As the adhesive sets, the titanium dioxide becomes glued to the surface of the fibers. The initial bath must not form globs that plug the matrix. It is possible to blow excess adhesive from the matrix with compressed air before blowing in titanium dioxide powder. Any method that deposits a high surface area of titanium dioxide into the matrix satisfies the present invention.

An ultraviolet optical source 2 is mounted in the chamber. This source supplies photons to excite the titanium dioxide in the mesh 3 to a photocatalytic state as explained in the next section. This optical source 2 should supply a wavelength shorter than 360 nm since this wavelength represents the cutoff energy for semiconductor bandgap excitation in titanium dioxide. A mercury lamp such as a Hanovia 450 Watt lamp is sufficient but may require more power than is necessary since it is only necessary to supply enough photons to excite most of the surface area of the titanium dioxide. It is entirely possible to use lower power low-pressure UV lamps in the present invention. To fully excite the titanium dioxide, it is desirable to achieve a photon flux of between 0.5–1.3 times 10 to the 15 photons per square cm per second. However, the present invention will work satisfactorily at lower intensities.

Air containing carbon monoxide enters the reaction chamber through an orifice 4; the CO reacts with the titanium dioxide, and air containing the resulting carbon dioxide exits from a second orifice 5. The maximum flow rate depends of such factors as the total surface area of the titanium dioxide, the concentration of CO in the incoming air, the degree of conversion required, and the intensity of the UV optical source. An alternative embodiment of the present invention suitable for an HVAC duct can be made from a frame containing the fibrous material (see FIG. 4).

Figure 2:
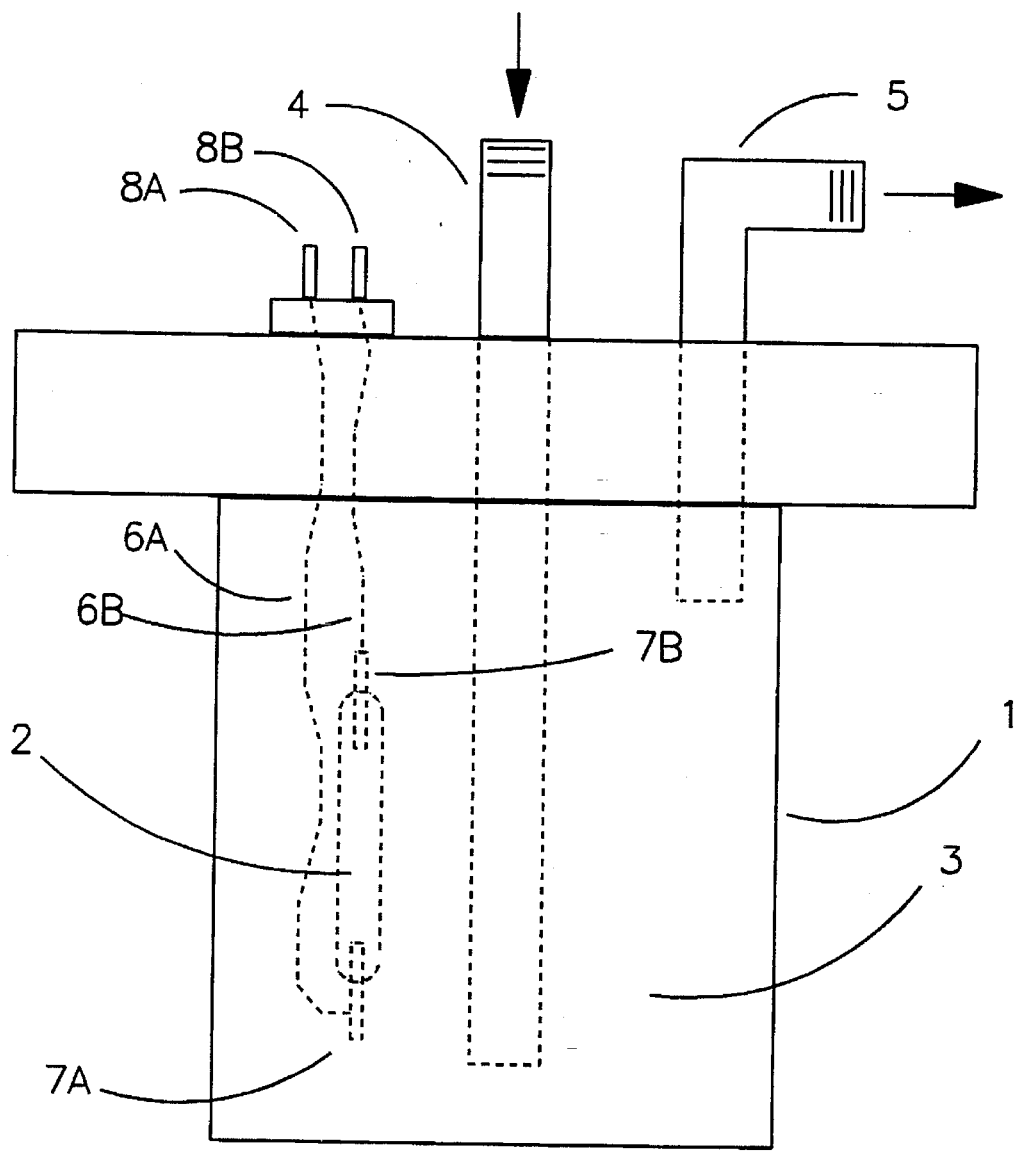
FIG. 2 shows a conceptual design for a possible reaction chamber.

FIG. 2 shows a reaction chamber for removing carbon monoxide from air that is piped. Incoming air enter a first orifice 4, interacts with a matrix containing titanium dioxide 3 and exits from a second orifice 5. An ultraviolet light source 2 is embedded in the matrix to supply photons to the titanium dioxide. The UV light source 2 is powered by wires 6A and 6B from its electrodes 7A and 7B. These wires 6 run to external electrodes 8A and 8B from where they are attached to a power supply.

Figure 3:
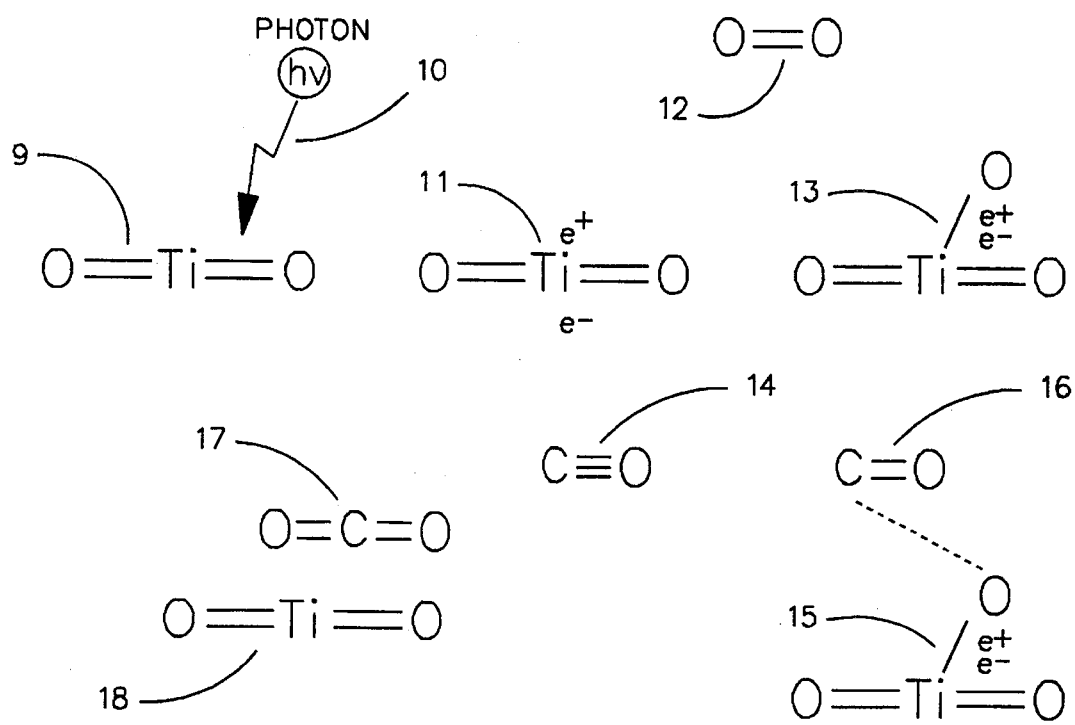
FIG. 3 is a diagram showing the essential steps of the dry titanium dioxide photocatalytic chemistry as carbon monoxide is converted to carbon dioxide.

FIG. 3 shows schematically the titanium dioxide surface photochemistry involved in oxidation of carbon monoxide to carbon dioxide. The outer electron orbitals of pure titanium contain two $3d$ electrons and two $4s$ electrons. In the oxide these four electrons from partially covalent and partially ionic bonds with two oxygen atoms. The two $3d$ electrons are no longer in the $3d$ band of the titanium atom, but in the $2p$ band of the extra oxygen. This bonding is ionic. Since the $3d$ band of pure titanium dioxide is empty, the pure oxide is an insulator. Slight impurities create holes in the oxygen $2p$ band and conduction electrons in the titanium $3d$ band to make the slightly impure material an extrinsic semiconductor. The material normally appears as an n type semiconductor since the typical impurities lead to an excess of conduction electrons.

Excitation of this band structure by a photon of sufficient energy creates extra holes and electrons in pairs as an electron from the valance band is excited to the conduction band. The bandgap energy is approximately 3.45 electron volts. Thus the wavelength of the exciting UV light must be shorter than 360 nm.

In FIG. 3, titanium dioxide 9 is excited by photons of sufficient energy 10 producing extra hole and electron pairs 11. In the presence of an electrophilic compound such as oxygen gas molecules, the solid surface is covered by negative adsorbed molecules. Therefore, the photo-produced hole is attracted to the surface by the electric field thus created. Under these conditions, the semiconductor becomes capable of separating the photo-produced charges and can behave as a photo-catalyst. Maintenance of electrical neutrality is achieved either by direct charge recombination or by an equilibrium between the holes reacting with an oxidizable negative species and electrons captured by a reducible species.

Thus in FIG. 3, oxygen molecules 12 are attracted to the surface of the excited titanium dioxide 13. Conduction electrons convert O2 molecules to adsorbed O2 radicals. Holes convert the adsorbed molecules to single adsorbed O atoms at the surface. Carbon monoxide 14 attaches briefly to this complex 15\16. The adsorbed oxygen atom reacts immediately to form carbon dioxide 17, and the titanium dioxide 18 remains unchanged from its initial state 18. The reaction continues in equilibrium at the surface of the titanium dioxide as long as there are enough photons to keep the catalyst excited, and enough carbon monoxide to convert to carbon dioxide. In the absence of carbon monoxide or other compounds to convert, and the in the continued presence of sufficient photons, the excited titanium dioxide-oxygen complex 13 is relatively stable.

Figure 4:
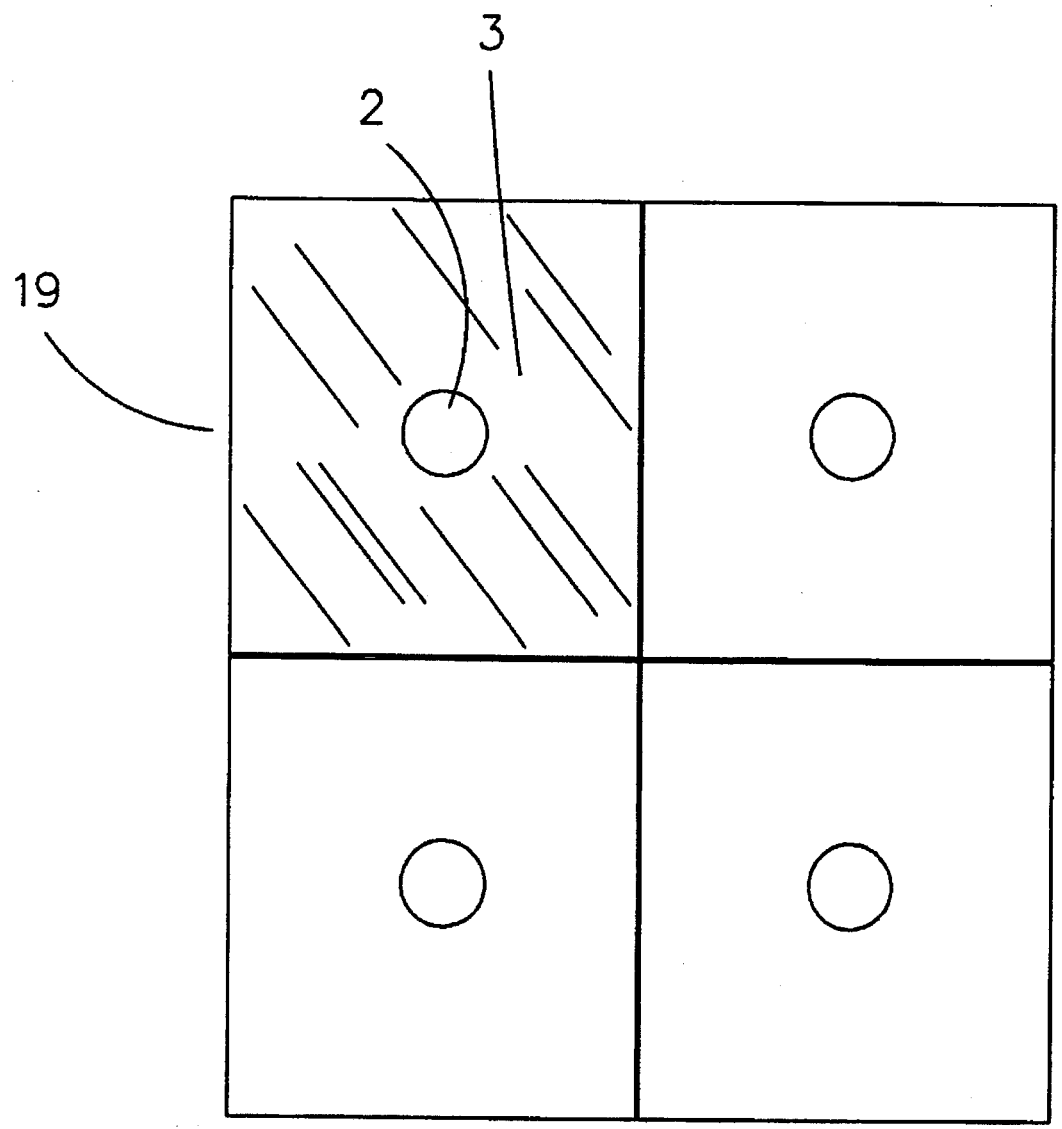
FIG. 4 shows a flat plate filter suitable for HVAC systems.

FIG. 4 shows a filter suitable for use in a duct associated with an HVAC system. A frame 19 of some suitable support material such as wood holds a matrix of fibers 3 that are coated with titanium dioxide. The filter is divided into tiles, and each tile contains an ultraviolet light source 2 to photo-excite the titanium dioxide in that tile. The fibrous material, which can be fiberglass or similar material, is from 0.5 to several inches thick. Normal HVAC flow rates through such tiles significantly reduce the amount of carbon monoxide in building air. The filter does not poison or degrade with time. However, air entering the filter should be prefiltered to first remove particulate matter that might lodge in the carbon monoxide filter.

An alternative method of supplying UV light to the filter matrix is to use lossy optical waveguides. Here UV light of sufficient intensity and energy is launched into the fiber as with any other light fiber; however, the fiber is constructed with a particularly thin cladding that allows light to leak. Also there is very little difference (if any) in refractive index between the core and the cladding. Multimode plastic fibers that pass ultraviolet are particularly suitable for this application. The end of such a fiber should preferably contain a reflector so that there is no light loss from the fiber end; rather, the light diffuses out along the fiber in a uniform fashion. It is also possible to attach the titanium dioxide directly to these fibers providing the outer or reacting surface of the catalyst is exposed to enough light to become photo-excited.

Figure 5:
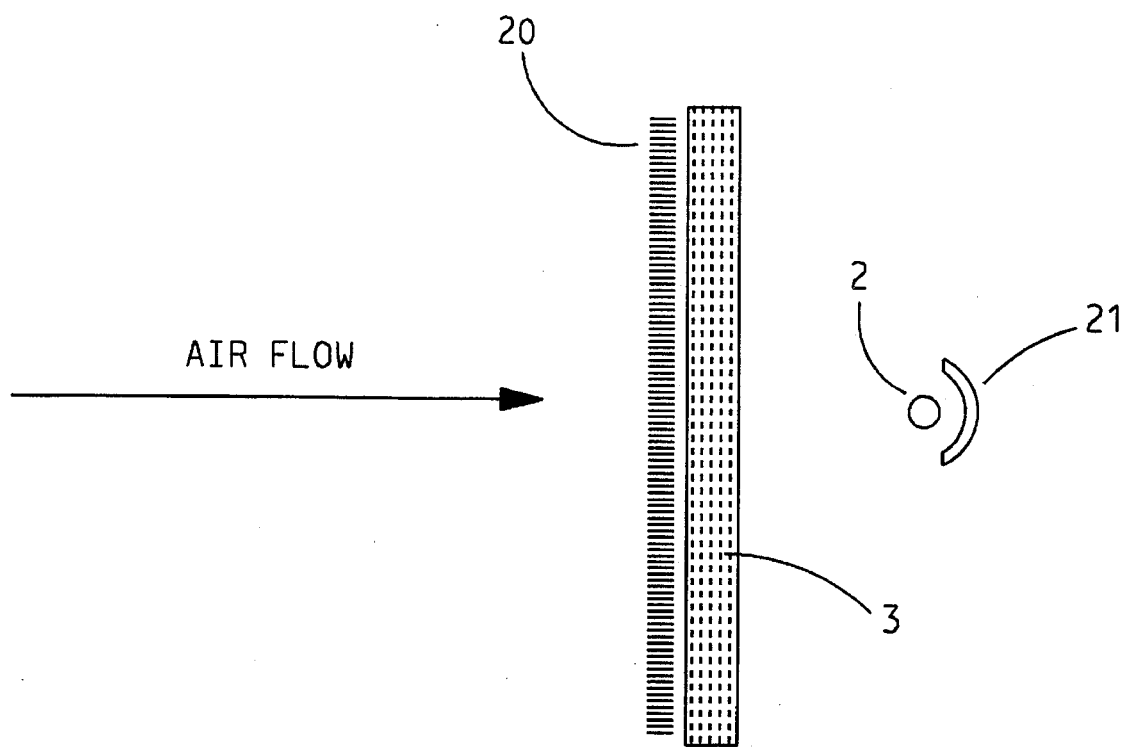
FIG. 5 shows another flat plate filter suitable for use in HVAC systems.

FIG. 5 shows another flat plate filter suitable for use in an air duct in a HVAC system. Fibrous material coated with titanium dioxide 3 is placed in a flat frame several inches thick. The fibrous material may be fiber glass or any other fiber web capable of holding titanium dioxide powder. A particularly attractive material is zeolite which is a chemical matrix capable of holding other compounds in its structure. The zeolite or zeolite membrane is pretreated with titanium dioxide before it is placed in the matrix 3. A UV light source 2 illuminates and photo-excites the titanium dioxide 3. Behind the UV light source 2 is an optional reflector 21 that causes most of the light from the source to impinge upon the titanium dioxide 3.

Upstream of the titanium dioxide matrix 3 is an optional layer of volatile organic compound (VOC) capture medium. This optional layer 20 allows the filter to also remove VOC contaminants from the air along with carbon monoxide. This captive 20 medium, since it is "sticky", can be used to hold some or all of the titanium dioxide to increase carbon monoxide removal if desired. If titanium dioxide is used on such a sticky layer, means must be provided to illuminate it so it becomes photoexcited. The filtering medium holding the titanium dioxide may take the form of fibers, pellets, or coated surfaces of all types.

We claim:

1. A filter for removing carbon monoxide from air suitable for use in HVAC systems comprising, in combination:

frame for mounting the filter in an air duct;

a web of fibrous material coated with titanium dioxide fixedly mounted to said frame;

a lossy optical waveguide collocated with said web for photoexciting the titanium dioxide;

an ultraviolet light source coupled to said lossy optical waveguide for supplying the waveguide with ultraviolet light;

means for passing air through the web of fibrous material, whereby carbon monoxide present in said air is photocatalytically converted to carbon dioxide.

2. The filter of claim 1 wherein said lossy optical waveguide is plastic.

3. The filter of claim 1 wherein said ultraviolet light source produces light of wavelength between 200 nm and 400 nm.

4. The filter of claim 1 wherein the fibrous material is zeolite.

* * * * *